United States Patent [19]

Kitamura et al.

[11] Patent Number: 5,047,469

[45] Date of Patent: Sep. 10, 1991

[54] NOVEL POLYVINYL ALCOHOL AND PROCESS FOR PRODUCING POLYVINYL ALCOHOL BY HYDROLYSIS CATALYZED BY ACIDS

[75] Inventors: Takanori Kitamura, Kurashiki; Yuuji Takenouchi, Okayama; Kunio Abe, Kurashiki, all of Japan

[73] Assignee: Kuraray Co., Ltd., Kurashiki, Japan

[21] Appl. No.: 307,949

[22] Filed: Feb. 9, 1989

[30] Foreign Application Priority Data

Feb. 10, 1988 [JP] Japan .................................. 63-29308
Dec. 13, 1988 [JP] Japan .................................. 63-315506

[51] Int. Cl.$^5$ ............................................. C08F 16/06
[52] U.S. Cl. ........................................ 525/56; 525/62
[58] Field of Search .................................... 525/56, 62

[56] References Cited

U.S. PATENT DOCUMENTS

| | | | |
|---|---|---|---|
| 2,983,696 | 5/1961 | Tocker | 525/62 |
| 3,028,374 | 4/1962 | Ehmann et al. | 525/62 |
| 3,296,236 | 1/1967 | Tanner | 525/62 |
| 3,631,225 | 12/1971 | Tenney | 525/62 |

FOREIGN PATENT DOCUMENTS

| | | | |
|---|---|---|---|
| 0355185 | 11/1972 | U.S.S.R. | 525/62 |
| 0828993 | 2/1960 | United Kingdom | 525/62 |
| 0941743 | 11/1963 | United Kingdom | 525/62 |

Primary Examiner—Joseph L. Schofer
Assistant Examiner—J. M. Reddick
Attorney, Agent, or Firm—Oblon, Spivak, McClelland, Maier & Neustadt

[57] ABSTRACT

The polyvinyl alcohol of the present invention is a partially saponified polyvinyl alcohol having a saponification degree of 70 to 98 mol % and containing a larger amount of methanol-soluble substances than that contained in polyvinyl alcohols having the same saponification degree obtained by known processes, and is novel.

And, the process for producing polyvinyl alcohol of the present invention comprises saponifying polyvinyl esters in a solvent of a polyoxyalkylene ether having in the molecule thereof a structural unit represented by the general formula [I]:

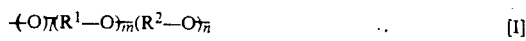

wherein $R^1$ and $R^2$ each represents an alkylene group having 2 to 5 carbon atoms in the main chain thereof, which may be substituted with a lower alkyl group or lower alkoxy group; l is an integer of 0 or 1; m and n each represents 0 or an integer of 1 to 10; and $1+m+n \geq 2$; with the catalyst of an aliphatic or aromatic sulfonic acid at an elevated temperature in the presence of water. The process can produce polyvinyl alcohol having a higher saponification degree at a higher reaction rate than conventional hydrolysis processes catalyzed by acids.

14 Claims, No Drawings

NOVEL POLYVINYL ALCOHOL AND PROCESS FOR PRODUCING POLYVINYL ALCOHOL BY HYDROLYSIS CATALYZED BY ACIDS

BACKGROUND OF THE INVENTION

1. Field of the Invention

The present invention relates to a novel polyvinyl alcohol having excellent characteristics suited for various uses, and more particularly to a novel polyvinyl alcohol having a saponification degree of 70 to 98 mol % and a block character, $\eta$, of at least 0.55, and satisfying the following formula ①:

$$Y \geqq -0.86X + 85 \qquad ①$$

wherein X represents the saponification degree (mol %) and Y represents the percentage by weight of the methanol-soluble substances in said polyvinyl alcohol (wt %).

The present invention also relates to a process for saponifying polyvinyl esters utilizing an acid catalyst, and particularly to a process which comprises conducting saponification reaction of polyvinyl esters in a reaction system comprising a solvent of a polyoxyalkylene ether compound having a specific structure unit later described and a catalyst of an aliphatic or aromatic sulfonic acid in the presence of water. The process can produce polyvinyl alcohol having a higher saponification degree at a higher reaction rate than conventional processes of hydrolysis catalysed by acids.

2. Description of the Related Art

Polyvinyl alcohol is a representative water-soluble polymer, and its various performance characteristics can be widely modified by controlling the properties such as polymerization degree and saponification degree. Polyvinyl alcohol has, making use of its various characteristics, been widely used in such advanced industrial fields as for polyvinyl alcohol fiber, textile processing agents, paper processing agents, adhesives, emulsion stabilizers, butyral resin, cosmetics, medicines and further for ceramics binders, high-strength polyvinyl alcohol fiber, and the like.

Further, partially saponified polyvinyl alcohol, which partially contains residual ester groups, has been developed, while its multifunctionality is utilized, for various uses, as printing material, dispersant for producing polyvinyl chloride, stabilizer for emulsions such as polyvinyl acetate emulsion, water-soluble films for packaging detergents, agricultural chemicals, etc., ceramics binders, etc.

Among the above, for example the use as printing material requires a polyvinyl alcohol having a good compatibility with acrylic monomers and a high flexibility for making clear printing plates; the use as dispersant for producing polyvinyl chloride requires a polyvinyl alcohol dispersant by the use of which the polyvinyl chloride resin produced will have a sharp distribution of diameters of polymer particles and high porosity, and removal of residual vinyl chloride monomer is easy, and which has good absorptive capacity for plasicizers and forms little fisheyes; the use as emulsion stabilizer requires a polyvinyl alcohol having an improved stabilizing effect for emulsion; the use as water-soluble films requires a polymer having a high flexibility at low temperatures which can decrease the amount of plasticizers added thereto; and the use as ceramics binder requires a flexible polyvinyl alcohol readily formable into sheet, and the like.

And also, for the production of polyvinyl alcohol by hydrolysis, or saponification, of polyvinyl esters, processes utilizing base catalysts and those with acid catalysts have been continuously studied. The latter processes have been found to have problems such as extremely low reaction rate compared to the former, thereby requiring large amounts of mineral acids which would strongly corrode equipment.

Commercial production of polyvinyl alcohol therefore is solely conducted by processes utilizing base catalysts, though saponification with acid catalysts can give polyvinyl alcohol having interesting properties resulting from hydrolysis catalysed by acids and has such advantages as that the carboxylic acid originating from starting material polyvinyl ester can directly be recovered for re-use.

In saponification processes comprising principally methanolysis catalysed by bases in an alcoholic solvent such as methanol currently in use, however, carboxylic acid esters are formed as byproducts from the carboxylic acids constituting starting material polyvinyl ester and solvent alcohols, thereby requiring a high utility cost and a complex procedure for the recovery to re-use of carboxylic acids from the thus formed carboxylic acid esters.

On the other hand, processes for producing polyvinyl alcohol utilizing saponification reaction of polyvinyl esters catalysed by acids have intensively been studied in 1950' and 1960', and descriptions thereof are found for example in Japanese Patent Publication Nos. 8845/1954, 3549/1956, 2195/1959, 1495/1962 and 988/1966.

In particular, Japanese Patent Publication No. 1495/1962 disclosed a process for producing polyvinyl alcohol which comprises saponifying polyvinyl esters in a solvent which can dissolve the starting material polyvinyl ester and cannot dissolve the corresponding polyvinyl alcohol, in the presence of an acid catalyst. Further the patent disclosed that a tertiary alcohol, ester, cyclic ether or mixtures thereof is used as such solvent, and that water is used in an amount not to dissolve the polyvinyl alcohol produced, whereby the produced polyvinyl alcohol is separated out as a solid from the reaction system. The patent describes tertiary butanol and tetrahydrofuran as examples of preferred solvents for the reaction system. According to the Example described therein, saponification reaction is performed in the presence of a mineral acid comprising principally sulfuric acid. The process requires a reaction time of more than 10 hours until the separating-out of the polyvinyl alcohol produced, and is hence very unsatisfactory for commercial production.

SUMMARY OF THE INVENTION

The present inventors have intensively studied to obtain a polyvinyl alcohol having excellent characteristics suited for the various applications, and as a result found that the afore-mentioned requirements can be satisfied by a novel polyvinyl alcohol having a saponification degree within a specified range and a larger methanol-soluble content than that in the conventional polyvinyl alcohols, and completed the invention.

By the effective use of the novel polyvinyl alcohol, the various requirements in the fields including the aforementioned can well be satisfied.

And also, in view of the afore-mentioned situation concerning the saponification processes, the present inventors have intensively studied processes for producing polyvinyl alcohol utilizing hydrolysis catalysed by acids, and as a result found a reaction system of hydrolysis catalysed by an acid, which, while using a solvent capable of separating out the polyvinyl alcohol that forms, can assure a reaction time as short as that in current processes for hydrolysis catalysed by bases, and completed the invention.

Thus, according to their detailed study, the above object was found to be accomplished by conducting a saponification reaction of polyvinyl ester in a solvent of a polyoxyalkylene ether having a specific structure unit with an organic sulfonic acid soluble in said solvent as catalyst, at an elevated temperature in the presence of water.

DETAILED DESCRIPTION OF THE PREFERRED EMBODIMENTS

The present invention provides a novel polyvinyl alcohol having a saponification degree of 70 to 98 mol % and a block character, $\eta$, of at least 0.55, and satisfying the following formula ①:

$$Y \geq -0.86X + 85 \qquad ①$$

wherein X represents the saponification degree (mol %) and Y represents the percentage by weight of the methanol-soluble substances in said polyvinyl alcohol (wt %).

The present invention also provides a process for producing polyvinyl alcohol, which comprises saponifying polyvinyl esters in a solvent of a polyoxyalkylene ether having in the molecule thereof a structural unit represented by the general formula [I]:

$$\{O\}_l\{R^1-O\}_m\{R^2-O\}_n \qquad [I]$$

wherein $R^1$ and $R^2$ each represents an alkylene group having 2 to 5 carbon atoms in the main chain thereof, which may be substituted with a lower alkyl group or lower alkoxy group; l is an integer of 0 or 1; m and n each represents 0 or an integer of 1 to 10; and $l+m+n \geq 2$; with the catalyst of an aliphatic or aromatic sulfonic acid at an elevated temperature in the presence of water.

First, the novel polyvinyl alcohol of the present invention is described in more detail.

The polyvinyl alcohol of the present invention is a polyvinyl alcohol having a saponification degree of 70 to 98 mol % and a block character, $\eta$, of at least 0.55, and satisfying the following formula ①:

$$Y \geq -0.86X + 85 \qquad ①$$

wherein X represents the saponification degree (mol %) and Y represents the percentage by weight of the methanol-soluble substances in said polyvinyl alcohol (wt %). more preferably satisfying the following formulae ① and ②:

$$Y \geq -0.86X + 85 \qquad ①$$

$$Y \leq -0.96X + 114.5 \qquad ②$$

wherein X represents the saponification degree (mol %) and Y represents the percentage by weight of the methanol-soluble substances in said polyvinyl alcohol (wt %).

Here the block character, $\eta$, used in the invention means a value calculated by the following equation:

$$\eta = (OH, OAc)/2(OH)(OAc)$$

wherein (OH,OAc) is, in the absorption intensities given below measured by $^{13}$C-NMR spectrum, the ratio expressed in molar fraction of the intensity of absorption by methylene group in (b) to those by methylene groups in (a), (b) and (c) all of which are dyads:

$$\{CH-CH_2-CH\}, \qquad (a)$$
$$\;\;|\qquad\quad\;\;|$$
$$\;OH\qquad\;OH$$

$$\{CH-CH_2-CH\}, \text{ and} \qquad (b)$$
$$\;\;|\qquad\quad\;\;|$$
$$\;OH\qquad\;OAc$$

$$\{CH-CH_2-CH\}; \qquad (c)$$
$$\;\;|\qquad\quad\;\;|$$
$$\;OAc\qquad\;OAc$$

and (OH) and (OAc) represent the saponification degree and the content of residual vinyl acetate groups respectively, both expressed in molar fraction.

Accordingly, the polyvinyl alcohol of the present invention is a novel partially saponified polyvinyl alcohol having a saponification degree of 70 to 98 mol % which contains a larger amount of methanol-soluble substances than that contained in polyvinyl alcohols having the same saponification degree obtained by known processes.

For example, if a polyvinyl alcohol having a saponification degree of 90 mol % obtained by saponification of a polyvinyl acetate having a polymerization degree of 1750 using the process of the present invention later described herein is subjected to extraction with hot methanol, there will be extracted at least 13% by weight of methanol-soluble substances based on the polyvinyl alcohol charged.

According to the detailed study made by the present inventors, methanol-soluble substances are contained in polyvinyl alcohols having a saponification degree of about 90 mol % obtained by known acid-catalysed hydrolysis (sulfuric acid catalyst/t-butanol solvent) in an amount of 2 to 3% by weight, and further methanol-soluble substances contained in a polyvinyl alcohol having the same saponification degree obtained by reacetylation of completely saponified polyvinyl alcohol is nearly the same as the above-mentioned value, proving that these polyvinyl alcohols are remarkably different from the polyvinyl alcohol obtained by the process of the present invention in terms of the content of methanol-soluble substances.

The polyvinyl alcohol of the present invention, which has various characteristic physical properties, is a polyvinyl alcohol having a saponification degree of 70 to 98 mol %, preferably 75 to 95 mol %, more preferably 84 to 94 mol %. Polyvinyl alcohols having a saponification degree exceeding 98 mol % or one less than 70 mol % are not appreciably different from polyvinyl alcohols obtained by known processes in the physical properties. The polymerization degree of the polyvinyl alcohol of the present invention is generally in a range of from 100 to 5,000, preferably from 300 to 3,000, more preferably from 300 to 2,000.

The novel polyvinyl alcohol of the present invention is obtained by the process also disclosed by the present invention relating to saponification process later described in detail, which comprises conducting saponification reaction of polyvinyl esters in a solvent of a linear or cyclic polyoxyalkylene ether compound having a specific structure unit with a catalyst of an aliphatic or aromatic sulfonic acid at an elevated temperature in the presence of water.

As described above, the present invention provides a novel polyvinyl alcohol which is a partially saponified polyvinyl alcohol having a saponification degree of 70 to 98 mol % and containing a larger amount of methanol-soluble substances than that contained in polyvinyl alcohols having the same degree of saponification obtained by known processes. It is expected that by the use of the polyvinyl alcohol of the present invention in various industrial fields, as printing material, dispersant for producing polyvinyl chloride, stabilizer for emulsions, water-soluble films, ceramics binders, etc. the requirements in the fields can be satisfied, and hence the industrial significance of the present invention is great.

Next, the present invention relating to a saponification process is described in more detail.

As described before, the present invention provides a process for producing polyvinyl alcohol, which comprises saponifying polyvinyl esters in a solvent of a polyoxyalkylene ether having in the molecule thereof a structural unit represented by the general formula [I]:

   [I]

wherein $R^1$ and $R^2$ each represents an alkylene group having 2 to 5 carbon atoms in the main chain thereof, which may be substituted with a lower alkyl group or lower alkoxy group; l is an integer of 0 or 1; m and n each represents 0 or an integer of 1 to 10; and $l+m+n \geq 2$; with the catalyst of an aliphatic or aromatic sulfonic acid at an elevated temperature in the presence of water.

The present invention is characterized by the selective combination of the solvent of specific polyoxyalkylene ether having in the molecule thereof a structural unit represented by the general formula [I]:

   [I]

wherein $R^1$ and $R^2$ each represents an alkylene group having 2 to 5 carbon atoms in the main chain thereof, which may be substituted with a lower alkyl group or lower alkoxy group; l is an integer of 0 or 1; m and n each represents 0 or an integer of 1 to 10; and $l+m+n \geq 2$; with the saponification catalyst of an organic sulfonic acid.

Hereinbelow the process of the present invention is described in more detail.

A preferred embodiment of the polyoxyalkylene ethers having in the molecule thereof a structural unit represented by the general formula [I] is cyclic polyoxyalkylene ethers represented by the general formula [II]:

   [II]

wherein $R^1$ and $R^2$ are as defined above, $m_1$ and $n_1$ each represents 0 or an integer of 1 to 10 and $m_1+n_1 \geq 2$.

The cyclic polyoxyalkylene ethers represented by formula [II] are described below. If $m_1+n_1=1$, it will be difficult to dissolve a starting material polyvinyl ester in said solvent in a high concentration, whereby the amount of the solvent is necessarily increased. There is no particular upper limit to $m_1+n_1$ but, the ethers satisfying the condition of $m_1+n_1 \leq 20$, more preferably $m_1+n_1 \leq 6$ are preferably used in view of availability, ease of separation and recovery of the carboxylic acid resulting from starting material polyvinyl ester, and so forth. Further, if the ether of formula [II] contains an unsubstituted or substituted methylene group, it will not be sufficiently stable under reaction conditions and tend to decompose to yield formaldehyde-associated compounds, which are not preferred.

Examples of the compounds represented by formula [II] are 1,4-dioxane, 2-methyl-1,4-dioxane, 2-ethyl-1,4-dioxane, 2,5-dimethyl-1,4-dioxane, 2-methyl-3-n-propyl-1,4-dioxane, 2,3,5,6-tetramethyl-1,4-dioxane, 2,2,5,5-tetramethyl-1,4-dioxane, 1,4-dioxepane, 6-methyl-1,4-dioxepane, 1,5-dioxocane, 3,7-dimethyl-1,5-dioxocane, 1,6-dioxecane, 1,4,7-trioxacyclononane, 1,4,7,10-tetraoxacyclododecane, 1,4,7,10,13-pentaoxacyclopentadecane, 1,4,7,10,13,16-hexaoxacyclooctadecane, and the like, among which particularly preferred is 1,4-dioxane.

Another preferred embodiment of the polyoxyalkylene ethers having in the molecule thereof a structural unit represented by the afore-mentioned general formula [I] is linear polyoxyalkylene ethers represented by the general formula [III]:

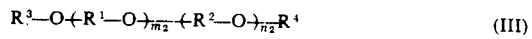   (III)

wherein $R^1$ and $R^2$ are as defined above and $R^3$ and $R^4$ each represents a linear or branched alkyl group having 1 to 10 carbon atoms, $m_2$ and $n_2$ each represents 0 or an integer of 1 to 10, and $m_2+n_2 \geq 1$.

The linear polyoxyalkylene ethers represented by formula [III] are described below. If $m_2+n_2=0$, the solubility of water in said solvent will be insufficient, whereby the reaction rate decreases and phase separation of the reaction system occurs, which are not preferred. There is no particular upper limit to $m_2+n_2$ but, the ethers satisfying the condition of $m_2+n_2 \leq 20$, more preferably $m_2+n_2 \leq 15$ are preferably used in view of availability, ease of handling and ease of separation and recovery of the carboxylic acid resulting from starting material polyvinyl ester, and so forth.

If the ether of formula [III] contains an unsubstituted or substituted methylene group, it will not be sufficiently stable under reaction conditions and tend to decompose to yield formaldehyde-associated compounds, which are not preferred.

Further, the ratio of the number of total carbon atoms to that of total oxygen atoms in the linear polyoxyalkylene ethers represented by formula [III] is preferably not higher than 6, more preferably not higher than 5.0, since otherwise, in some cases, the reaction system comprises two phases, resulting in unfavorable phenomena such as loss by dissolution in water of the polyvinyl alcohol produced (hereinafter sometimes referred to as PVA) and reduction in reaction rate due to localization to water layer of the catalyst aliphatic or aromatic sulfonic acid.

Examples of the ethers represented by formula [III] are ethylene glycol dimethyl ether, ethylene glycol diethyl ether, diethylene glycol dimethyl ether, diethylene glycol diethyl ether, diethylene glycol methyl-n- propyl ether, triethylene glycol dimethyl ether, triethylene glycol diethyl ether, tetraethylene glycol dimethyl ether, tetraethylene glycol diethyl ether, tetraethylene glycol methyl-i-amyl ether, propylene glycol dimethyl ether, dipropylene glycol diethyl ether, tripropylene glycol methyl-i-propyl ether, 1,3-propanediol dimethyl ether, 2-methyl-1,3-propanediol dimethyl ether, 1,4-butanediol dimethyl ether, 2-methyl-1,4-butanediol dimethyl ether, 2,5,9-trioxadecane, 3-methyl-2,5,8-trioxanonane, 2,5,10-trioxaundecane, glycerine trimethyl ether, pentaerythritol tetramethyl ether and trimethylolpropane trimethyl ether, among which preferred are diethers comprising ethylene glycol or its polymers having a low polymerization degree.

The polyoxyalkylene ethers having in the molecule thereof a structure unit represented by the aforementioned formula [I] are used in such an amount as to give a solution containing 1 to 50% by weight, preferably 10 to 30% by weight, more preferably 15 to 30% by weight of the starting material polyvinyl ester, which solution is then supplied to the reaction system.

The above polyoxyalkylene ethers having a specific structural unit have an apparent superiority over conventional solvents in performing the process of the present invention. For example, if tertiary butanol which is described as a preferred solvent in Japanese Patent Publication No. 1495/1962 is used under the reaction conditions employed in the present invention, dehydration reaction of tertiary butanol into isobutylene will take place together with the hydrolysis, which is not preferred. Tetrahydrofuran (THF) is not preferred either, since the solubility of starting material polyvinyl ester in THF is insufficient as compared to that in the polyoxyalkylene ethers of the present invention; and hence if it is attempted to dissolve a polyvinyl ester in THF in a high concentration, insoluble matters will form a separate phase in the reaction system. Then, a complex separation and purification operation would be required to obtain PVA in this case. Thus, an excess THF must be added to the reaction system to avoid such complex operation, thereby causing an increase in the amount of reaction liquor, which in turn leads to an increase in equipment cost.

The polyvinyl esters used in the present invention include homopolymers of vinyl esters, copolymers of different vinyl esters and copolymers of a vinyl ester and other ethylenically unsaturated monomers.

Examples of the vinyl esters are aliphatic vinyl esters such as vinyl acetate and vinyl propionate and vinyl ester of Versatic (trade name), among which preferred is vinyl acetate. Examples of copolymers of vinyl esters are ones of vinyl acetate with another vinyl ester such as vinyl stearate or vinyl ester of Versatic.

There is no particular limitation on the other ethylenically unsaturated monomers as long as they are copolymerizable with vinyl esters, and their examples are given in POVAL (revised edition), p.281-285, (1981) issued on Apr. 1, 1981 from Kobunshi Kankokai, Tokyo, and also in the literature cited therein.

The acid catalysts used in the present invention are aliphatic or aromatic sulfonic acids soluble in the polyoxyalkylene ethers having a structural unit represented by formula [I].

Such organic sulfonic acids include aryl sulfonic acids and arylene disulfonic acids which may be substituted with lower alkyl groups, and linear or branched alkyl sulfonic acids and alkylene disulfonic acids, which can catalyze saponification. Preferably used among them are aryl sulfonic acids or arylene disulfonic acids which may be substituted with lower alkyl groups and alkyl sulfonic acids or alkylene disulfonic acids having not more than 20 carbon atoms, more preferably not more than 10 carbon atoms. These sulfonic acids are used singly or as admixtures of two or more.

Examples of the organic sulfonic acids are benzenesulfonic acid, p-toluenesulfonic acid, $\alpha$- or $\beta$-naphthalenesulfonic acid, 3,4-dimethylbenzenesulfonic acid, 2-methyl-5-i-propylbenzenesulfonic acid, 1,5-naphthalenedisulfonic acid, 1,6-naphthalenedisulfonic acid, 2,7-naphthalenedisulfonic acid, methanesulfonic acid, ethanesulfonic acid, n-butanesulfonic acid, n-octanesulfonic acid, decanesulfonic acid, i-octanesulfonic acid and 1,2-ethanedisulfonic acid.

The organic sulfonic acids are used in an amount of 0.001 to 1 equivalent, preferably 0.01 to 0.2 equivalent based on the ester groups in starting material polyvinyl ester.

After the reaction, the organic acid can be reused through the circulation to the reaction system of the bottoms obtained by distillation to recover the carboxylic acid originating from the starting material, which bottoms have been, if necessary, separated and purified.

A detailed study done by the present inventors revealed that the organic sulfonic acids used as catalysts in the reaction system of the present invention have a larger reaction activity than conventional mineral acid catalysts represented by sulfuric acid.

The inventors has also studied intensively on the reaction temperature and found that the reaction can proceed smoothly without generating such problems as coloring of the reaction system, at a higher temperature than those so far disclosed in the literature as the reaction temperatures for acid-catalysed hydrolysis, whereby the reaction rate can be increased.

The reaction temperature employed in the invention is 75° to 160° C., preferably 80° to 140° C. At temperatures below 75° C., the reaction rate is not high, while the reaction temperature exceeding 160° C. may cause a high pressure in the reaction system depending on the solvents used, or may cause unfavorable properties such as coloring of the PVA produced.

Thus, there is established a technique for producing PVA, in which the catalytic activity of acid catalysts is increased and an elevated reaction temperature can be employed, thereby greatly reducing time required for separation of produced PVA from the reaction system to, though depending on amount of catalyst and reaction temperature, about 10 minutes to 2 hours, and which can readily produce a highly saponified PVA having a saponification degree of more than 95% at a short reaction time of about 0.5 to 3 hours.

The amount of water supplied to the reaction system should be kept within a limit not to dissolve the PVA that forms, and is generally 1 to 10 molar equivalents, preferably 1.5 to 8.0 molar equivalents based on the ester groups of starting material polyvinyl ester, though the ratio depends on the desired saponification degree of the PVA that forms.

The process of the present invention can hydrolyse polyvinyl esters obtained by any polymerization process such as solid phase polymerization, solution polymerization, emulsion polymerization or suspension polymerization. As the acyl residues of the polyvinyl esters which can be converted into PVA according to the process of the invention, they are preferably acid residues consisting of linear or branched alkyl groups having 1 to 10 carbon atoms.

The PVA produced is separated from the saponification mixture by a usual mechanical method, for example by filtering, centrifuging or squeezing off, and it is then washed with the solvent for use in the process of the invention or a solvent for washing until it is free from the organic sulfonic acid used as the catalyst and the carboxylic acid that forms. After drying, a colorless PVA is obtained.

The present process can readily produce PVA's which are colorless, have only a very small amount of ash originating from carboxylic acid, and have a sharp distribution of saponification degree and a good solubility, in a short reaction period.

The present process can also readily produce PVA having a high saponification degree in which the content of residual acy group is not more than 1% by a single step reaction.

Further, the present process does not require the carboxylic acid recovery process empolyed in the conventional process utilizing methanolysis with base catalysts, which recovers the carboxylic acid via by-produced carboxylic acid esters, resulting in a high utility cost. Instead, the present process can directly recover the carboxylic acid from the reaction mixture, and is hence expected to be low in the utility cost and to need only a simplified recovery process.

As described heretofore, the significance of the production process of PVA of the present invention is great.

A more complete appreciation of the invention and many of the attendant advantages thereof will be readily obtained as the same become better understood by reference to the following detailed descriptions of exemplary embodiments which are given for illustration of the invention and are not intended to be limiting thereof.

EXAMPLE 1

A reaction vessel made of glass having 1-liter capacity equipped with a thermometer, magnetic stirrer, heater, feeding port, sample outlet, and pressure gauge was charged with 60 g of polyvinyl acetate (polymerization degree: 1,750; hereinafter abbreviated as PVAc) which is 0.70 mole as converted into the residual ester groups contained in the PVAc and 180 ml of 1,4-dioxane. After a thorough replacement of the inside of the vessel by nitrogen gas, the vessel was heated until the inside temperature got to 80° C. and the PVAc was dissolved with stirring. After the dissolution, in a nitrogen atmosphere a solution of 14 g (0.074 mole) of p-toluenesulfonic acid monohydrate in 50 g (2.78 moles) of water was added at once from the feeding port, and the mixture was heated, while standing still, to an inside temperature of 100° C. (gauge pressure: 0.7 kg/cm$^2$). After the inside temperature had been confirmed to be 100° C. constant, the stirring was started at 500 rpm to perform saponification reaction. The reaction liquid was a colorless, transparent, viscous and homogeneous solution. Formation of PVA was first observed 20 minutes after the start of the reaction and stirring was continued for further 5 minutes and then stopped. The reaction mixture was cooled and then the PVA that formed was separated from the reaction liquor. The PVA separated was white without any coloring.

The thus obtained PVA was cut into small pieces and the pieces were washed with 1,4-dioxane and then dried on a water bath of 40° C. under a reduced pressure. After the drying, the PVA was determined for the saponification degree by titration to give a saponification degree of 90%.

The block character, $\eta$, obtained from the $^{13}$C-NMR spectrum was 0.73.

5.2 g of the PVA obtained (non-volatizable residue: 96% by weight) was precisely weighed and then charged into a cylindrical filter paper. The filter with the contents was packed in a Soxhlet extractor. Extraction was conducted with an extraction solvent of methanol (120 ml) for 24 hours under reflux. Then, methanol was distilled off from the methanol extract, and the residue was kept in a dryer with internal air circulation at 110° C. for one hour to be completely removed of volatile matter. The dry content was allowed to be cooled in the desiccator and weighed to give 0.69 g (13.8% by weight based on the PVA charged).

EXAMPLES 2 THROUGH 8

Example 1 was repeated except for changing the polymerization degree of PVAc charged, reaction temperature and reaction time, to obtain PVA's having various polymerization degrees and saponification degrees. The block characters of the obtained PVA's were in the range of from 0.73 to 0.75.

The PVA's were measured for methanol-soluble contents in the same manner as in Example 1. The results are shown in Table 1.

TABLE 1

| Example | Reaction temperature (°C.) | Reaction time (min) | PVA produced PA[1] | saponification degree (mol %) | Methanol-extract (% by wt.) |
|---|---|---|---|---|---|
| 2 | 90 | 70 | 2000 | 86.0 | 17.5 |
| 3 | 90 | 85 | 1750 | 93.5 | 3.5 |
| 4 | 90 | 50 | 1750 | 73.5 | 30.3 |
| 5 | 100 | 25 | 550 | 91.0 | 15.5 |
| 6 | 90 | 55 | 550 | 78.5 | 24.0 |
| 7 | 80 | 65 | 550 | 72.5 | 32.4 |
| 8 | 90 | 90 | 300 | 94.5 | 4.0 |

[1]Average degree of polymerization

COMPARATIVE EXAMPLE 1

Example 1 was repeated except for using 5.7 g (0.058 mole) of sulfuric acid instead of p-toluenesulfonic acid, and 180 ml of t-butanol instead of 1,4-dioxane, and employing a reaction temperature of 82° C. and a reaction time of 270 min to obtain a PVA having a saponification degree of 83.5%. The block character, $\eta$, of the PVA obtained was 0.71. The PVA was measured for the methanol extract in the same manner as in Example 1 to give 10.2% by weight.

COMPARATIVE EXAMPLE 2

Comparative Example 1 was repeated except for employing a reaction time of 285 min to obtain a PVA having a saponification degree of 90.8%. The block character, $\eta$, of the PVA obtained was 0.71. The PVA was measured for the methanol extract in the same manner as in Example 1 to give 3.0% by weight.

COMPARATIVE EXAMPLE 3

25 g of a completely saponified PVA having a polymerization degree of 1750 was dissolved with heating in 450 ml of water, and the solution was charged together with 750 ml of acetic acid and 50 ml of 1/10N hydrochloric acid to a three-neck flask equipped with a thermometer and a stirrer having a capacity of 2 liters. The flask was kept in the water bath of 40° C. for 1.5 hours while the contents was stirred to effect reacetylation reaction of the PVA. After the reaction, the contents of the flask was added to 10 liters of acetone with stirring, to separate PVA as deposit. The PVA separated was, after having been squeezed of the liquid, dissolved in 500 g of water, and the solution was neutralized with aqueous ammonia until the pH of the solution got to 6.5. The neutralized solution was again added to 3 liters of acetone to separate out PVA. The thus separated PVA was, after the squeezing off of the liquid, dried in a dryer with internal air circulation at 50° C. The thus obtained PVA had a saponification degree of 90.5% and a block character, $\eta$, of 0.74. The PVA was measured for the methanol extract in the same manner as in Example 1 to give 2.3% by weight.

COMPARATIVE EXAMPLE 4

Comparative Example 3 was repeated except for changing the reaction time to 2.5 hours to obtain a reacetylated PVA. The obtained PVA had a saponification degree of 85.0%, and a methanol extract measured in the same manner as in Example 1 of 10.5% by weight.

COMPARATIVE EXAMPLE 5

Comparative Example 3 was repeated except for changing the reaction time to 0.5 hour to obtain a reacetylated PVA. The obtained PVA had a saponification degree of 94.6%, and a methanol extract measured in the same manner as in Example 1 of 0.7% by weight.

EXAMPLE 9

A reaction vessel made of glass having 1-liter capacity equipped with a thermometer, magnetic stirrer, heater, feeding port, sample outlet, and pressure gauge was charged with 60 g of polyvinyl acetate (polymerization degree: 1,750) which is 0.70 mole as converted into the residual ester groups contained in the PVAc and 180 ml of 1,4-dioxane. After a thorough replacement of the inside of the vessel by nitrogen gas, the vessel was heated until the inside temperature got to 80° C. and the PVAc was dissolved with stirring. After the dissolution, in a nitrogen atmosphere a solution of 14 g (0.074 mole) of p-toluenesulfonic acid monohydrate in 50 g (2.78 moles) of water was added at once from the feeding port, and the mixture was heated, while standing still, to an inside temperature of 100° C. (gauge pressure: 0.7 kg/cm$^2$). After the inside temperature had been confirmed to be 100° C. constant, the stirring was started at 500 rpm to perform saponification reaction. The reaction liquid was a colorless, transparent, viscous and homogenous solution. Formation of PVA was first observed 20 minutes after the start of the reaction and stirring was continued for further 60 minutes and then stopped. The reaction mixture was cooled and then the PVA that formed was separated from the reaction liquor. The PVA separated was white without any coloring.

The thus obtained PVA was cut into small pieces and the pieces were washed with 1,4-dioxane and then dried on a water bath of 40° C. under a reduced pressure. After the drying, the PVA was determined for the saponification degree by titration to give a saponification degree of 97%. The solution remaining after the reaction and separation was colorless and transparent, and analysis thereof by gas chromatography confirmed that acetic acid had formed quantitatively.

EXAMPLES 10 THROUGH 27

Saponification reactions of polyvinyl esters were conducted in the same manner as in Example 9 to study various reaction factors. The effects of starting material polyvinyl ester, solvents and catalysts are summarized in Table 2; the effect of reaction temperature in Table 3 and the effect of amount of water added to the reaction system in Table 4, respectively.

TABLE 2

| EXAMPLE No. | Polyvinyl ester | Solvent | Catalyst (molar ratio)[1] | H$_2$O (molar ratio)[1] | Reaction temperature | Reaction time | Saponification degree of PVA produced |
|---|---|---|---|---|---|---|---|
| 10 | PVAc | 1,4-dioxane | benzenesulfonic acid (0.1) | 4 | 110 (°C.) | 2 (hrs) | 99.5 (%) |
| 11 | PVAc | 1,4-dioxane | β-naphthalenedisulfonic acid (0.2) | 5 | 100 | 1 | 97.5 |
| 12 | polyvinyl formate | 1,4-dioxane | 2,7-naphthalenedisulfonic acid (0.1) | 4 | 80 | 2.5 | 94.5 |
| 13 | PVAc | 1,5-dioxecane | 1-octanesulfonic acid (0.1) | 3 | 85 | 2 | 91.0 |
| 14 | PVAc | 2-ethyl-1,4-dioxane | ethanesulfonic acid (0.05) | 5 | 95 | 2 | 98.0 |
| 15 | PVAc | 2,5-dimethyl-1,4-dioxane | p-toluenesulfonic acid (0.2) | 4 | 120 | 0.7 | 96.0 |
| 16 | polyvinyl capronate | 1,6-dioxecane | 1,2-ethanedisulfonic acid (0.05) | 3 | 90 | 2 | 91.5 |
| 17 | polyvinyl propionate | 18-crown-6 | isopropanesulfonic acid (0.05) | 4 | 95 | 2.5 | 97.5 |
| 18 | polyvinyl propionate | 12-crown-6 | 1-pentanesulfonic acid (0.1) | 4 | 100 | 1.5 | 98.5 |
| 19 | PVAc | 1,4-dioxane[2] | 3,4-dimethylbenzenesulfonic acid (0.1) | 6 | 100 | 2 | 99.0 |
| 20 | PVAc | 1,4-dioxane[2] | benzenesulfonic acid (0.01) | 3 | 150 | 1.5 | 90.5 |

[1]Molar ratio based on the ester groups in polyvinyl ester.
[2]Amount of solvent added: 360 ml

TABLE 3

| EXAMPLE | Solvent | Catalyst (molar ratio)[1] | H₂O (molar ratio)[1] | Reaction temperature | Reaction time | Saponification degree of PVA produced | Remarks |
|---|---|---|---|---|---|---|---|
| 21 | 1,4-dioxane | p-toluenesulfonic acid (0.15) | 4 | 80 (°C.) | 2.5 (hrs) | 93.5 (%) | |
| 22[2] | 1,4-dioxane | benzenesulfonic acid (0.075) | 3 | 140 | 1.5 | 98.0 | |
| 23 | 1,4-dioxane | 2,7-naphthalene-disulfonic acid (0.1) | 3 | 60 | 6.0 | 91.0 | |
| 24[2] | 1,4-dioxane | 1-octanesulfonic acid (0.02) | 3 | 190 | 1.0 | 99.0 | Reaction mixture colored remarkably and the PVA produced also colored brown. |

[1]Molar ratio based on the ester groups in PVAc.
[2]Material of autoclave is SUS 316 (stainless steel) instead of glass.

TABLE 4

| EXAMPLE | Solvent | Catalyst (molar ratio)[1] | H₂O (molar ratio)[1] | Reaction temperature | Reaction time | Saponification degree of PVA produced | Remarks |
|---|---|---|---|---|---|---|---|
| 25 | 1,4-dioxane | benzenesulfonic acid (0.1) | 7 | 90 (°C.) | 2.0 (hrs) | 94.0 (%) | PVA solid was recovered nearly quantitatively. |
| 26 | 1,4-dioxane | p-toluenesulfonic acid (0.1) | 10 | 90 | 2.0 | 93.0 | Part of the produced PVA dissolved in the reaction solution and PVA solid was recovered in an amount of 96% based on the theoretical amount of PVA. |
| 27 | 1,4-dioxane | 3,4-dimethylbenzenesulfonic acid (0.1) | 15 | 90 | 2.0 | 91.5 | Part of the produced PVA dissolved in the reaction solution and PVA solid was recovered in an amount of 80% based on the theoretical amount of PVA. |

[1]Molar ratio on the ester groups in PVAc.

EXAMPLE 28

A reaction vessel made of glass having 1-liter capacity equipped with a thermometer, magnetic stirrer, heater, feeding port, sample outlet, and pressure gauge was charged with 60 g of PVAc (polymerization degree: 1,750) which is 0.70 mole as converted into the residual ester groups contained in the PVAc and 180 ml of diethylene glycol dimethyl ether. After a thorough replacement of the inside of the vessel by nitrogen gas, the vessel was heated until the inside temperature got to 80° C. and the PVAc was dissolved with stirring. After the dissolution, in a nitrogen atmosphere a solution of 14 g (0.074 mole) of p-toluenesulfonic acid monohydrate in 50 g (2.78 moles) of water was added at once from the feeding port, and the mixture was heated, while standing still, to an inside temperature of 100° C. After the inside temperature had been confirmed to be 100° C. constant, the stirring was started at 500 rpm to perform saponification reaction. The reaction liquid was a colorless, transparent, viscous and homogeneous solution. Formation of PVA was first observed 40 minutes after the start of the reaction and stirring was continued for further 60 minutes and then stopped. The reaction mixture was cooled and then the PVA that formed was separated from the reaction liquor. The PVA separated was white without any coloring.

The thus obtained PVA was cut into small pieces and the pieces were washed with acetone and then dried on a water bath of 50° C. under a reduced pressure. After the drying, the PVA was determined for the saponification degree by titration to give a saponification degree of 95%. The solution remaining after the reaction and the separation was colorless and transparent, and analysis thereof by gas chromatography confirmed that acetic acid formed quantitatively.

EXAMPLES 29 THROUGH 46

Saponification reactions of polyvinyl esters were conducted in the same manner as in Example 28 to study various reaction factors. The effects of starting material polyvinyl ester, solvents and catalysts are summarized in Table 5; the effect of reaction temperature in Table 6 and the effect of amount of water added to the reaction system in Table 7, respectively.

TABLE 5

| EXAMPLE | Polyvinyl ester | Solvent (total C/total O)[1] | Catalyst (molar ratio)[2] | H₂O (molar ratio)[2] | Reaction temperature | Reaction time | Saponification degree of PVA produced |
|---|---|---|---|---|---|---|---|
| 29 | PVAc | diethylene glycol dimethyl ether (2.0) | benzenesulfonic acid (0.1) | 4 | 100 (°C.) | 2 (hrs) | 98.0 (5) |
| 30 | PVAc | triethylene glycol diethyl ether (2.5) | β-naphthalene-sulfonic acid (0.2) | 5 | 100 | 1 | 96.5 |
| 31 | polyvinyl formate | ethylene glycol diethyl ether (3.0) | 1,2-ethanedi-sulfonic acid (0.1) | 4 | 85 | 2 | 94.5 |
| 32 | PVAc | ethylene glycol dimethyl ether (2.0) | ethanesulfonic acid (0.1) | 3 | 80 | 2.5 | 91.0 |
| 33 | PVAc | diethylene glycol methyl-n-propyl ether (2.7) | 1-octanesulfonic acid (0.1) | 5 | 95 | 2 | 96.5 |
| 34 | PVAc | tetraethylene glycol dibutyl ether (3.2) | 3,4-dimethylbenzene-sulfonic acid (0.2) | 4 | 120 | 0.8 | 95.0 |
| 35 | polyvinyl capronate | dipropylene glycol dimethyl ether (2.7) | 2,7-naphthalenedi-sulfonic acid (0.04) | 3 | 90 | 2 | 93.5 |

TABLE 5-continued

| EXAMPLE | Polyvinyl ester | Solvent (total C/total O)[1] | Catalyst (molar ratio)[2] | H$_2$O (molar ratio)[2] | Reaction temperature | Reaction time | Saponification degree of PVA produced |
|---|---|---|---|---|---|---|---|
| 36 | polyvinyl propionate | 1,3-propanediol dimethyl ether (2.5) | 1-pentanesulfonic acid (0.08) | 4 | 95 | 2 | 95.5 |
| 37 | polyvinyl propionate | 1,4-butanediol dimethyl ether (3.0) | n-propanesulfonic acid (0.1) | 4 | 100 | 1.5 | 97.0 |
| 38 | PVAc | 3-methyl-2,5,8-trioxanonane (2.3)[3] | p-toluenesulfonic acid (0.1) | 6 | 100 | 2 | 97.5 |
| 39 | PVAc | 2,5,9-trioxadecane (2.3) | benzenesulfonic acid (0.02) | 3 | 140 | 1.5 | 91.5 |

[1] Ratio of the number of total carbon atoms to that of total oxygen atoms contained in the ether molecule.
[2] Molar ratio based on the ester groups in PVAc.
[3] Amount of solvent added: 360 ml

TABLE 6

| EXAMPLE | Solvent | Catalyst (molar ratio)[1] | H$_2$O (molar ratio)[1] | Reaction temperature | Reaction time | Saponification degree of PVA produced | Remarks |
|---|---|---|---|---|---|---|---|
| 40 | diethylene glycol dimethyl ether | benzenesulfonic acid (0.15) | 4 | 80 (°C.) | 2.5 (hrs) | 91.5 (%) | |
| 41[2] | diethylene glycol dimethyl ether | p-toluenesulfonic acid (0.075) | 5 | 140 | 1.5 | 96.0 | |
| 42 | diethylene glycol dimethyl ether | 2,7-naphthalenedisulfonic acid (0.1) | 3 | 60 | 6.0 | 90.5 | |
| 43[2] | diethylene glycol dimethyl ether | benzenesulfonic acid (0.02) | 5 | 170 | 1.5 | 97.5 | Reaction mixture colored remarkably and the PVA produced also colored brown. |

[1] Molar ratio based on the ester groups in PVAc.
[2] Material of autoclave is SUS 316 (stainless steel) instead of glass.

TABLE 7

| EXAMPLE | Solvent | Catalyst (molar ratio)[1] | H$_2$O (molar ratio)[1] | Reaction temperature | Reaction time | Saponification degree of PVA produced | Remarks |
|---|---|---|---|---|---|---|---|
| 44 | diethylene glycol dimethyl ether | 3,4-dimethylbenzenesulfonic acid (0.15) | 7 | 90 (°C.) | 2.0 (hrs) | 92.0 (%) | PVA solid was recovered nearly quantitatively. |
| 45 | diethylene glycol dimethyl ether | benzenesulfonic acid (0.1) | 10 | 90 | 2.0 | 90.5 | Part of the produced PVA dissolved in the reaction solution and PVA solid was recoverd in an amount of 94% based on the theoretical amount of PVA. |
| 46 | diethylene glycol dimethyl ether | p-toluenesulfonic acid (0.1) | 15 | 90 | 2.0 | 88.0 | Part of the produced PVA dissolved in the reaction solution and PVA solid was recovered in an amount of 76% based on the theoretical amount of PVA. |

[1] Molar ratio based on the ester groups in PVAc.

COMPARATIVE EXAMPLES 6 THROUGH 8

Saponification reactions were conducted by employing combinations of conventional known solvents and catalysts. The results are summarized in Table 8.

Obviously, numerous modifications and variations of the present invention are possible in light of the above teachings. It is therefore to be understood that within the scope of the appended claims, the invention may be practiced otherwise than as specifically described herein.

TABLE 8

| COMPARATIVE EXAMPLES | Solvent | Catalyst (molar ratio)[1] | H$_2$O (molar ratio)[1] | Reaction temperature | Reaction time | Saponification degree of PVA produced | Remarks |
|---|---|---|---|---|---|---|---|
| 6 | tetrahydrofuran | H$_2$SO$_4$ (0.05) | 4 | 85 (°C.) | 9.5 (hrs) | 91.5 (%) | PVAc did not fully dissolve in the reaction system, thereby causing the reaction system to form two phases. |
| 7 | t-butanol | H$_2$SO$_4$ (0.05) | 5 | 85 | 10.5 | 91.0 | When the reaction temperature exceeded 90° C., dehydration reaction of t-butanol into isobutylene also occurred. |
| 8 | methyl acetate | H$_2$SO$_4$ (0.05) | 3 | 85 | 11.0 | 88.5 | |

[1] Molar ratio base on the ester groups in PVAc.

What is claimed is:

1. A polyvinyl alcohol having a saponification degree of 70 to 98 mol % and a block character, $\eta$, of at least 0.55 and satisfying the following formula (1):

$$Y \geqq -0.86X+85 \qquad \text{①}$$

wherein X represents the saponification degree (mol %) and Y represents the percentage by weight of the methanol-soluble substances in said polyvinyl alcohol (wt %).

2. The polyvinyl alcohol according to claim 1, satisfying the following formulae ① and ②:

$$Y \geqq -0.86X+85. \qquad \text{①}$$

$$Y \leqq -0.96X+114.5 \qquad \text{②}$$

wherein X represents the saponification degree (mol %) and Y represents the percentage by weight of the methanol-soluble substances in said polyvinyl alcohol (wt %).

3. The polyvinyl alcohol according to claim 1, having a saponification degree of 75 to 95 mol %.

4. The polyvinyl alcohol according to claim 1, having a saponification degree of 84 to 94 mol %.

5. A process for producing polyvinyl alcohol, which comprises saponifying polyvinyl esters in a solvent of a polyoxyalkylene ether having in the molecule thereof a structural unit represented by the general formula [I]:

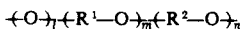  [I]

wherein $R^1$ and $R^2$ each represents an alkylene group having 2 to 5 carbon atoms in the main chain thereof, which may be substituted with a lower alkyl group or lower alkoxy group; l is an integer of 0 or 1; m and n each represents 0 or an integer of 1 to 10; and $l+m+n \geqq 2$; with the catalyst of an organic sulfonic acid at an elevated temperature in the presence of water.

6. The process for producing polyvinyl alcohol according to claim 5, wherein said polyoxyalkylene ether having in the molecule thereof said structure unit represented by formula [I] is a cyclic polyoxyalkylene ether having the formula [II]

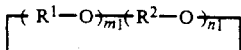  [II]

wherein $R^1$ and $R^2$ are as defined above, $m_1$ and $n_1$ each represents 0 or an integer of 1 to 10 and $m_1+n_1 \geqq 2$; a linear polyoxyalkylene ether represented by the formula [III]:

  [III]

wherein $R^1$ and $R^2$ are as defined above and $R^3$ and $R^4$ each represents a linear or branched alkyl group having 1 to 10 carbon atoms, $m_2$ and $n_2$ each represents 0 or an integer of 1 to 10, and $m_2+n_2 \geqq 1$; or mixtures thereof.

7. The process for producing polyvinyl alcohol according to claim 5, wherein said polyoxyalkylene ether having in the molecule thereof said structure unit represented by formula [I] is a cyclic polyoxyalkylene ether having the formula [II]:

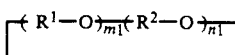  [II]

wherein $R^1$ and $R^2$ are as defined above, $m_1$ and $n_1$ each represents 0 or an integer of 1 to 10 and $m_1+n_1 \geqq 2$.

8. The process for producing polyvinyl alcohol according to claim 5, wherein said polyoxyalkylene ether having in the molecule thereof said structure unit represented by formula [I] is a linear polyoxyalkylene ether represented by the formula [III]:

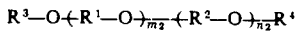  [III]

wherein $R^1$ and $R^2$ are as defined above and $R^3$ and $R^4$ each represents a linear or branched alkyl group having 1 to 10 carbon atoms, $m_2$ and $n_2$ each represents 0 or an integer of 1 to 10, and $m_2+n_2 \geqq 1$.

9. The process for producing polyvinyl alcohol according to claim 7, wherein said polyoxyalkylene ether having in the molecule thereof said structure unit represented by formula [II] is 1,4-dioxane.

10. The process for producing polyvinyl alcohol according to claim 5, wherein said organic sulfonic acid is an aryl sulfonic acid or arylene disulfonic acid which is may be substituted with a lower alkyl group, a linear or branched alkyl sulfonic acid or alkylene disulfoninc acid, or mixtures of two or more of the foregoing.

11. The process for producing polyvinyl alcohol according to claim 5, wherein the reaction temperature is 75° to 160° C.

12. The process for producing polyvinyl alcohol according to claim 5, wherein the reaction temperature is 80° to 140° C.

13. The process for producing polyvinyl alcohol according to claim 5, wherein water is added in an amount of 1 to 10 molar equivalents based on the ester groups of said polyvinyl ester.

14. The process for producing polyvinyl alcohol according to claim 5, wherein water is added in an amount of 1.5 to 8.0 molar equivalents based on the ester groups of said polyvinyl ester.

* * * * *